(12) United States Patent
Yokoi

(10) Patent No.: US 7,836,753 B2
(45) Date of Patent: Nov. 23, 2010

(54) KNOCK SENSOR

(75) Inventor: Akito Yokoi, Chiyoda-Ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 12/045,859

(22) Filed: Mar. 11, 2008

(65) Prior Publication Data

US 2009/0108171 A1   Apr. 30, 2009

(30) Foreign Application Priority Data

Oct. 24, 2007   (JP)   ............... 2007-276023

(51) Int. Cl.
*G01M 15/00*   (2006.01)
(52) U.S. Cl. ............... 73/35.11; 73/117.03; 264/328.12
(58) Field of Classification Search ....... 73/35.1–35.11, 73/116.02–116.03, 117.01–117.03, 118.01; 264/328.12, 328.8; 425/572, 129.1, 121, 425/127

See application file for complete search history.

(56) References Cited

U.S. PATENT DOCUMENTS 5,939,616 A * 8/1999 Ito et al. ................... 73/35.11
7,004,009 B2 * 2/2006 Yokoi et al. ............... 73/35.11

FOREIGN PATENT DOCUMENTS

| DE | 19960328 A1 | 6/2001 |
| DE | 102004053091 A1 | 12/2005 |
| EP | 0359409 A2 | 3/1990 |
| JP | 03039218 A | 2/1991 |
| JP | 2002055013 A | 2/2002 |
| JP | 2004028934 A | 1/2004 |
| JP | 2005-337858 A | 12/2005 |
| JP | 2006112858 A | 4/2006 |

OTHER PUBLICATIONS

German Office Action, dated Jun. 10, 2009.
Japanese Office Action, dated Sep. 1, 2009.

* cited by examiner

*Primary Examiner*—Richard Crispino
*Assistant Examiner*—Thu Khanh T Nguyen
(74) *Attorney, Agent, or Firm*—Sughrue Mion, PLLC

(57) ABSTRACT

A knock sensor includes a resin mold having a first cylindrical resin mold section that encloses a base, annular constituent parts and a pressing member of the knock sensor; and a connector section that protrudes from a side of the first mold section and is integrally injection-molded at one time with the first mold section; wherein an injection gate for resin mold is located on the first resin mold circumference excluding portions thereof opposing the connector section, and forms a predetermined angle (45° to 120°) with respect to the center line connecting the center of the connector section with that of a through-hole of the base.

12 Claims, 5 Drawing Sheets

RELATED ART

KNOCK SENSOR

BACKGROUND OF THE INVENTION

1. Field of the Invention

The present invention relates to a non-resonant knock sensor that is mounted on a combustion engine and, when knocking vibration occurs in the engine, converts the vibration into an electric signal by means of a piezoelectric element clamped in the sensor so as to lead the signal outside as an output signal.

2. Description of the Background Art

A conventional knock sensor will be described referring to the attached drawings.

FIG. 7 is a cross sectional view showing the interior construction of a knock sensor 40 generally known by, for example, Japanese Laid-Open Patent Publication No. 2005-337858. The sensor includes a metal base 2 having a discoid flange section 2a, a cylinder section 2b extending from the flange section 2a in its axial direction and a through-hole passing through both the flange section 2a and the cylinder section 2b. An annular lower insulation sheet 3, a lower terminal plate 4, an annular piezoelectric element 5, an upper terminal plate 6, an annular upper insulation sheet 7, an annular weight 8, and a disc spring 9 are inserted onto the metal base 2, in that order from the flange side of the base. A nut 10 is then screwed onto a male screw 2d threaded on the circumference of one end of the cylinder section 2b, so that the above-described annular constituent parts for the knock sensor are fastened onto the flange section 2a with predetermined torque using a tool such as a torque-wrench-tightening head. Thereafter, terminals 11 are connected to the lower terminal plate 4 and the upper terminal plate 6 by soldering, resistance welding or the like. While portions of the base 2 excluding the inner circumferential face and both end faces of the cylinder section 2b are covered with a first cylindrical mold section 12a, a connector section 12b for outputting a signal is made protruded from a side of the first cylindrical mold section 12a, and then integrally injection-molded therewith at one time, so as to form a resin mold 12; the knock sensor is constructed in this way.

A knock sensor of this kind is mounted on a combustion engine with a bolt, not shown in the figure, that is inserted into the through-hole 2c provided in the base 2 in its axial direction. When knocking vibration occurs in the combustion engine, the annular constituent parts for the knock sensor, including the annular piezoelectric element 5 and the annular weight 8, vibrate coupled with the knocking vibration, and the annular piezoelectric element 5 converts this vibration into an electric signal, so that a detected signal is outputted outside through the lower terminal plate 4 and the upper terminal plate 6.

FIG. 8 and FIG. 9 are external views showing a general knock sensor; FIG. 8 is a top view, FIG. 9, a side view, and FIG. 10, a cross sectional view along the line D-D' in FIG. 9. An injection gate 13 for the resin mold 12 of the knock sensor, as shown in FIG. 8 and FIG. 9, is generally located on the circumference of the first cylindrical mold section 12a, in a position 180° opposing the connector section 12b. As shown by arrows in FIG. 10, mold material molten by injection-molding is injected to branch into two paths around the circumference of the cylinder section 2b of the base 2, and then meets each other at the junction 15 indicated by X. The molten mold material, after meeting each other at the junction 15 indicated by X, continues to fill the connector section 12b. The molten mold material, after having completely filled the connector section 12b, is pressurized by applying pressure by an injection mold machine; thereby, the inherent strength of resin mold can be secured. A junction where molten mold material meets each other after branching into two paths is generally referred to as a weld, in which junction strength of the material (hereinafter referred to as weld strength) is known to be weaker than that in a non-weld portion.

In the conventional knock sensor 40 constructed described above, there arises a time difference until the molten mold material completely fills the connector section 12b of the resin mold 12 after it has met each other at the junction 15 of mold material indicated by X; thereby, after the molten mold material has completely filled the connector section 12b, cooling of the molten mold material at the junction 15 where mold material meets each other progresses due to this time difference, and its hardening progresses accordingly. Therefore, after the molten mold material has completely filled the connector section 12b, the resin strength, even if the material is pressurized by the injection mold machine, remains weaker at the junction 15 (weld portion) of the molten mold material than other portions (non-weld portions).

Meanwhile, the knock sensor is mounted on an engine block, which therefore undergoes heat shock due to heat generated when the engine runs and thermal difference generated between when the engine runs and when it stops. Resin mold for the knock sensor repeats contraction and expansion due to the heat shock described above, which results in the strength of the resin mold deteriorating, so that eventually cracks occur in the weld portion whose resin strength is weaker than other portions.

Cracks that merely occur in the resin mold do not affect output from the knock sensor. However, because the knock sensor is mounted on the engine block so as to be always exposed to moisture and dust, if a cracked portion of the resin mold gets wet, moisture will eventually penetrate into the interior of the knock sensor to reach the annular piezoelectric element 5, resulting in its output failure.

In injection-molding of resin mold for the conventional knock sensor, it is easy-to-manufacture, from a construction point of view, to inject material in a direction perpendicular to the cylinder section 2b of the base 2. However, a weld 16 as indicated by the broken line in FIG. 8 can not be avoided from being formed in a position 180° opposing the injection gate 13.

Since stress in the connector section 12b is generated due to thermal contraction and expansion, in the directions indicated by the thick allows in FIG. 8, thermal stress generated in the connector section 12b is greater than that generated in the first cylindrical mold section 12a of the cylinder section. In the conventional knock sensor, since the injection gate 13 is located in a position 180° opposing the protruding connector section 12b so that the weld 16 is formed between the cylinder section 2b of the base 2 and the connector section 12b, the weld would be in a particularly disadvantageous position.

SUMMARY OF THE INVENTION

The present invention has been made to resolve above-described underlying problems with a conventional knock sensor, an objective of which is to increase resin mold resistance against cracks so as to provide a highly reliable knock sensor that does not cause problems in its practical use environments.

A knock sensor according to the present invention comprises a base including a cylinder section, a flange section formed at one end of the cylinder section, and a through-hole passing through both the cylinder section and the flange section; annular constituent parts for the knock sensor, including an annular piezoelectric element, terminal plates through which an output signal is taken out from the electrodes of the piezoelectric element, annular insulation sheets and an annular weight, and inserted onto the cylinder section of the base; a pressing member for pressing the annular constituent parts onto the flange section of the base; and a resin mold including a first cylindrical mold section that encloses the base, the annular constituent parts and the pressing member, and a connector section that encloses a terminal or lead-wire lead-out section for connecting the terminal plates to outside equipment, and is integrally injection-molded at one time with the first mold section, protruding from a side thereof; wherein an injection gate for the resin mold is located on the first resin mold circumference excluding portions thereof opposing the connector section, and forms a predetermined angle with respect to the center line connecting the center of the connecting section with that of the through-hole of the base.

According to a knock sensor of the present invention, since the injection gate is located on the first resin mold circumference excluding portions thereof opposing the connector section that encloses the terminal or lead-wire lead-out section aiming for connection to outside equipment, a weld can be formed in a position where stress generated by resin's thermal contraction and expansion is less than that in the connector section.

Moreover, since locating the injection gate in the position described above shortens the distance from the injection gate to the connector section protruding from the resin mold, time length necessary for the mold material to completely fill the connector section to the extreme end thereof can be shortened, which resultantly decreases the time difference between this time length and time length necessary for the mold material to completely fill the weld portion. Consequently, it becomes difficult for cooling of the mold material in the weld portion to progress; the junction strength of the weld is enhanced by applying pressure by an injection mold machine; the resin mold resistance against cracks can be improved, so that a highly reliable knock sensor without causing any abnormal output in practical use environments can be obtained.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
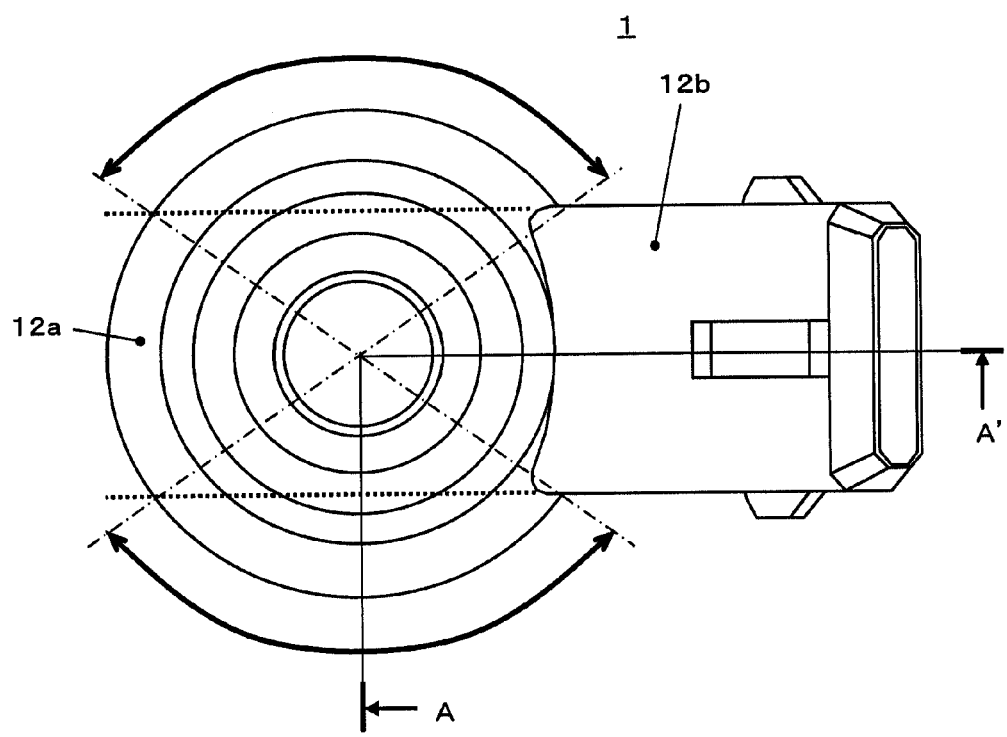
FIG. 1 is a top external view of a knock sensor according to Embodiment 1 of the present invention.

Hereinafter, a knock sensor according to Embodiment 1 of the present invention will be explained referring to the drawings.

Figure 2:
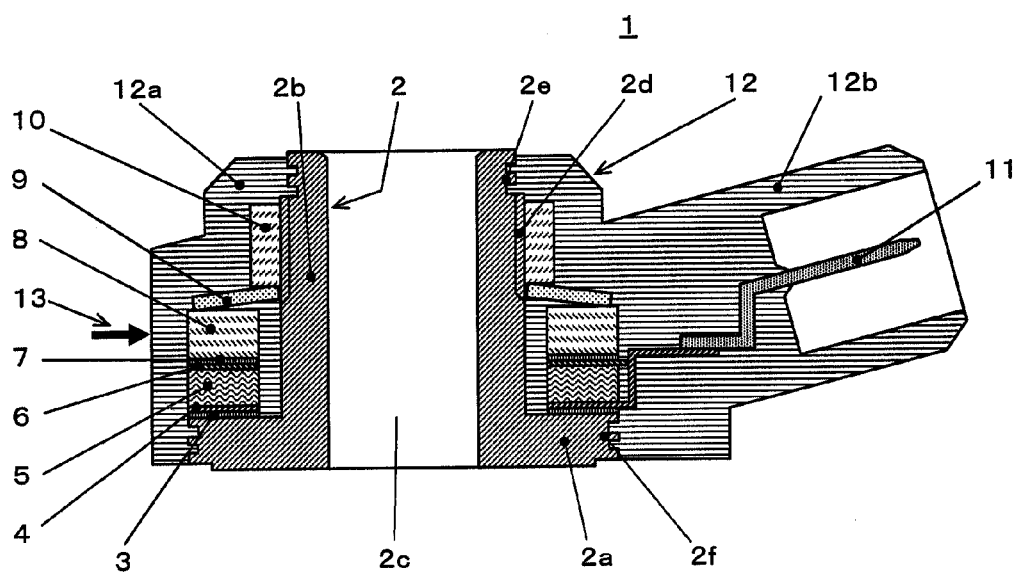
FIG. 2 is a cross-sectional view along the line A-A' in FIG. 1.

FIG. 1 is a top external view of the knock sensor according to Embodiment 1 of the present invention, in which a connector section aiming to connect the sensor to external equipment is integrally constructed by resin mold; FIG. 2 is a cross-sectional view of its interior construction along the line A-A' in FIG. 1.

In FIG. 1 and FIG. 2, numeral 1 denotes the knock sensor whose constituent parts described later are covered with a resin mold 12 (nylon 66, for example) that is formed by injection-molding from the injection gate 13 (refer to FIG. 2); the resin mold 12 includes a first cylindrical mold section 12*a* that encloses a metal base 2 described later, annular constituent parts for the knock sensor and a pressing member, and a connector section 12*b* that is integrally injection-molded at one time with the first cylindrical mold section 12*a*, protruding from a side thereof, and encloses terminals 11 to which wires from an ignition control device as the external equipment are connected.

Numeral 2 denotes the metal base of the knock sensor 1, which includes a discoid flange section 2*a*, a cylinder section 2*b* extending from the flange section 2*a* along the axis thereof, a through-hole 2*c* passing through both the flange section 2*a* and the cylinder sections 2*b*, and a male screw 2*d* threaded on the outer circumference of one end of the cylinder section 2*b*. On the outer circumferences of the flange section 2*a* and the endmost portion of the cylinder section 2*b*, engaging grooves 2*e* and 2*f* are formed to secure engaging with the resin mold 12 as well as to prevent outside moisture and the like from penetrating into the sensor.

Numeral 5 denotes an annular piezoelectric element that is inserted onto the cylinder section 2*b* of the base 2 so as to output as an electric signal vibration in the axial directions thereof transmitted through the base 2. Numeral 4 denotes a lower terminal plate that is formed of a conductive metal sheet and abuts on the lower surface of the piezoelectric element, being inserted onto the cylinder section 2*b* of the base 2. Similarly, numeral 6 denotes an upper terminal plate that is formed of a conductive metal sheet and abuts on the upper surface of the piezoelectric element, being inserted onto the cylinder section 2*b* of the base 2. Numeral 11 denotes terminals welded onto the lower terminal plate 4 and the upper terminal plate 6, which construct electric terminals of the connector section 12*b*.

Numeral 3 denotes a lower insulation sheet that is annularly formed of a thin insulation resin sheet; the lower insulation sheet 3 is inserted onto the cylinder section 2*b* of the base 2 so as to insulate the lower terminal plate 4 from the cylinder section 2*a* of the base 2. Similarly, numeral 7 denotes an upper insulation sheet that is annularly formed of a thin insulation resin sheet; the upper insulation sheet 7 is inserted onto the cylinder section 2*b* of the base 2 so as to insulate the upper terminal plate 6 from an annular weight 8 described later.

Numeral 8 denotes the annular weight that gives vibration force to the piezoelectric element 5, which is inserted onto the cylinder section 2*b* of the base 2 and placed on the upper side of the upper insulation sheet 7. Hereinafter, a set of the piezoelectric element 5, the lower terminal plate 4, the upper terminal plate 6, the lower insulation sheet 3, the upper insulation sheet 7, and the weight 8 are as a whole referred to as annular constituent parts for the knock sensor.

Numeral 9 denotes a disc spring, which is inserted onto the cylinder section 2b of the base 2 and placed on the upper side of the weight 8. Numeral 10 denotes a nut, namely a pressing member, that is fixedly screwed onto the male screw 2d threaded on the circumference of the one end of the cylinder section 2b of the base 2, with the set of the annular constituent parts-including the lower insulation sheet 3, the lower terminal plate 4, the piezoelectric element 5, the upper terminal plate 6, the upper insulation sheet 7 and the weight 8—and the disc spring that are inserted onto the cylinder section 2b of the base 2 being sandwiched between the nut and the flange section 2a of the base 2.

In the knock sensor constructed described above, according to Embodiment 1 of the present invention, the mold-material injection gate for the resin mold 12 is located, as shown in FIG. 1, in the ranges indicated by the arrows, on the circumference of the first cylindrical mold section 12a excluding portions thereof opposing the connector section 12b. The mold-material injection gate for the resin mold 12 is located as described above on the circumference of the first cylindrical mold section 12a excluding portions thereof opposing the connector section 12b, that is, the gate is located in a position, on the circumference of the first cylindrical mold section 12a, where the gate forms a predetermined angle with respect to the center line connecting the center of the connector section 12b with that of the through-hole 2c of the base 2; thereby, a weld can be formed in a position where thermal stress caused by resin's thermal contraction and expansion is less than that in the position where the connector section 12b is located.

Moreover, locating the injection gate in the position described above shortens the distance from the injection gate 13 to the connector section 12b protruding from the side of the first cylindrical mold section 12a, resulting in time length necessary for mold material to completely fill the connector section 12b to the extreme end thereof being shorter, so that the time difference between the above-described time length and time length necessary for mold material to completely fill the weld portion becomes shorter, which consequently makes it difficult for cooling of mold material in the weld portion to progress; the junction strength of the weld can be enhanced by applying pressure by the injection mold machine; as a result, resin mold resistance against cracks can be improved, so that a highly reliable knock sensor without causing any abnormal output in actual use environments can be obtained.

Embodiment 2

Figure 3:
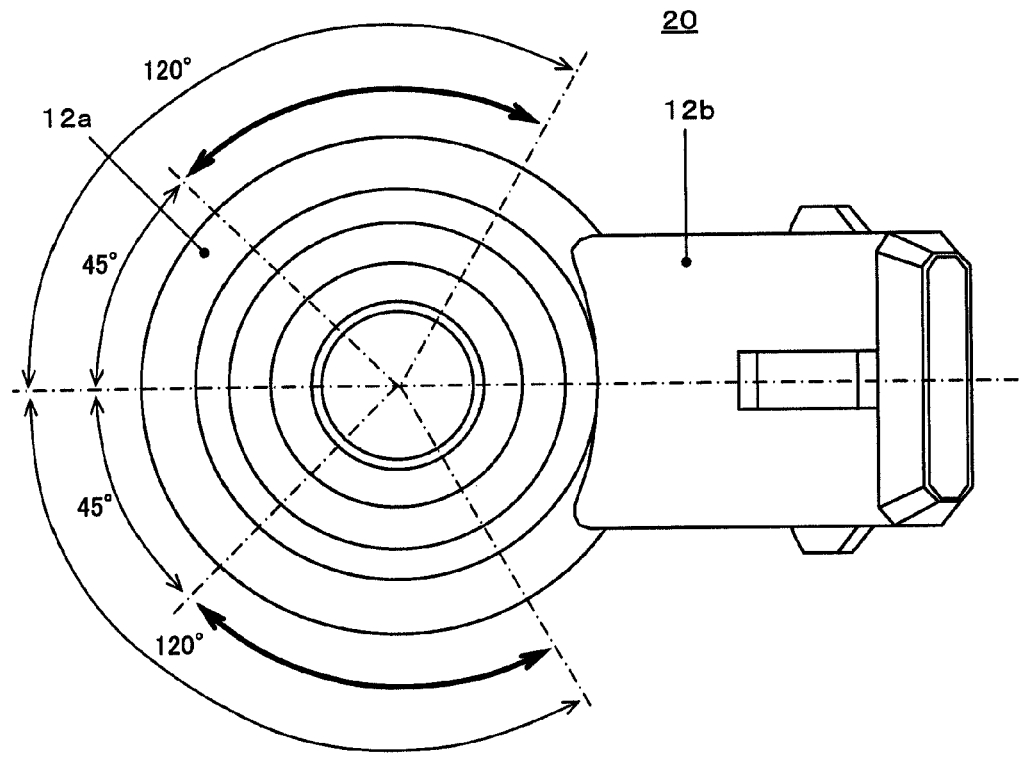
FIG. 3 is a top external view of a knock sensor according to Embodiment 2 of the present invention.

FIG. 3 is a top external view of a knock sensor 20 according to Embodiment 2 of the present invention. The interior construction of the knock sensor according to Embodiment 2 is the same as that of Embodiment 1 described above; however, in Embodiment 2 the injection gate for resin mold 12 is located in such a way that the gate is on the circumference of the first cylindrical mold section 12a and forms an angle in a range between 45° to 120° with respect to the center line connecting the center of the cylinder section of the base 2 with that of the connector section 12b, namely the protruding section.

According to Embodiment 2 of the invention, since the injection gate is located taking into consideration productivity in mass production, the same effect as that of Embodiment 1 can be brought about without impairing the strength of the molding die.

Embodiment 3

Figure 4:
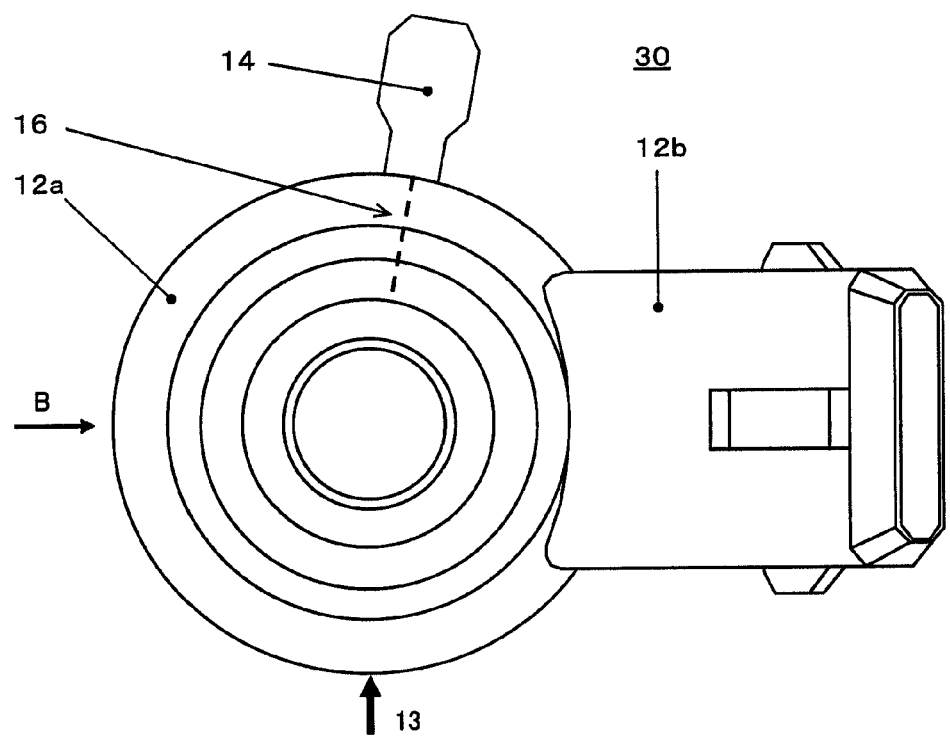
FIG. 4 is a top external view of a knock sensor according to Embodiment 3 of the present invention.
Figure 5:
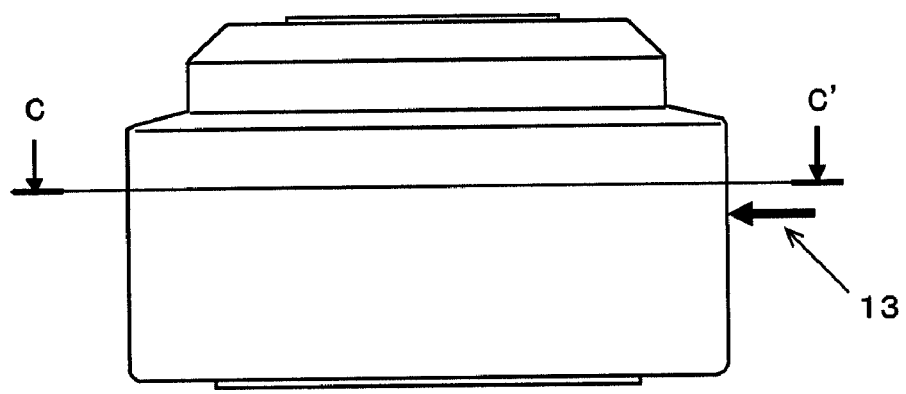
FIG. 5 is a view of the knock sensor viewed from the direction indicated by B in FIG. 4.
Figure 6:
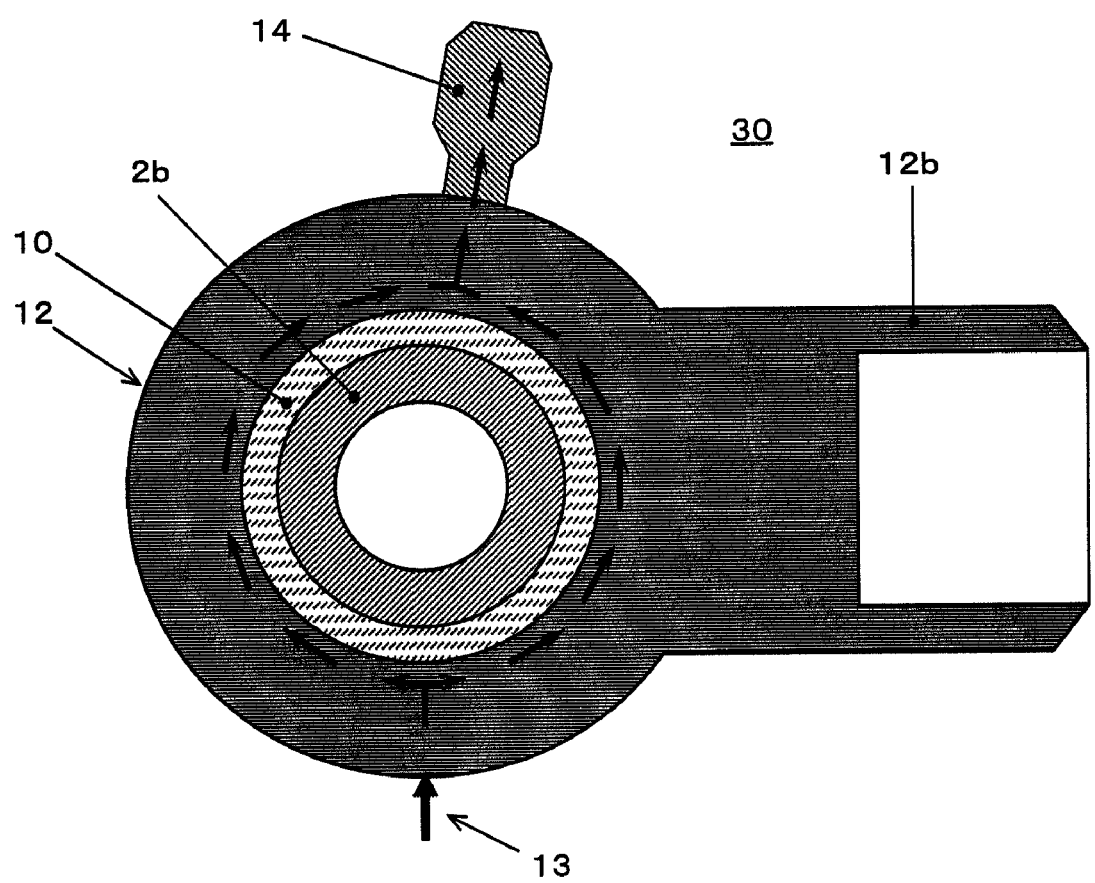
FIG. 6 is a cross-sectional view along the line C-C' in FIG. 5.
Figure 7:
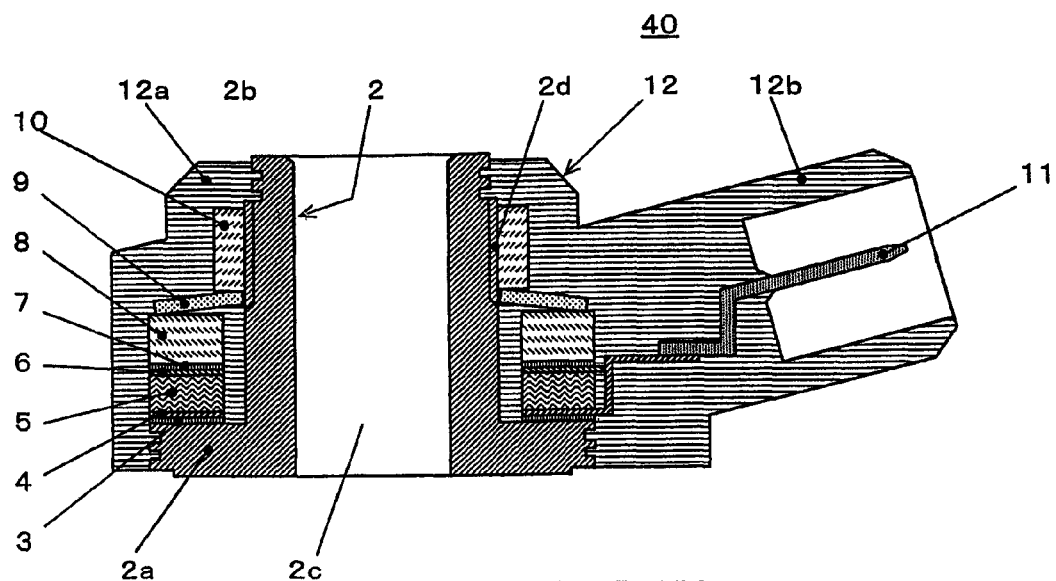
FIG. 7 is a cross-sectional view of an example of a conventional knock sensor.
Figure 8:
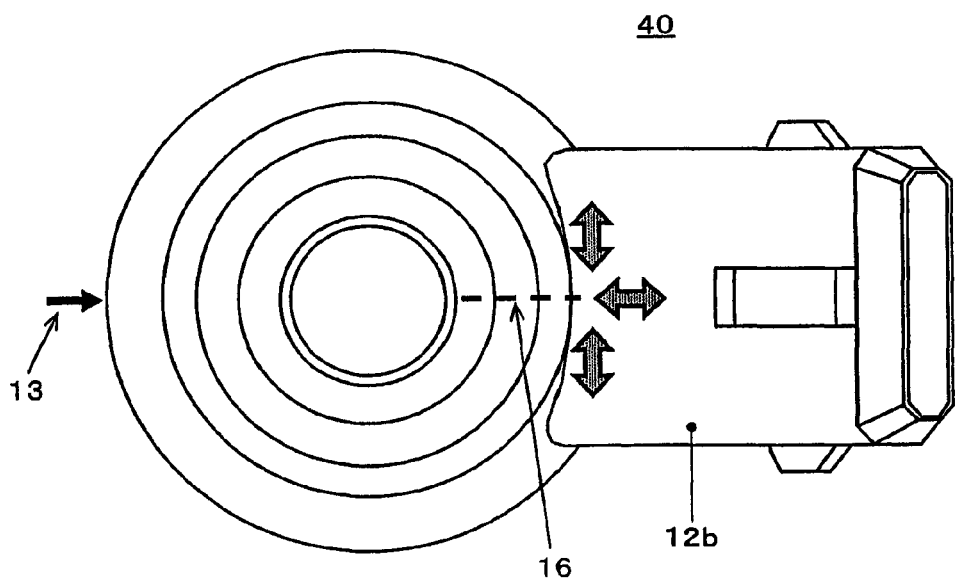
FIG. 8 is a top external view of the conventional knock sensor.
Figure 9:
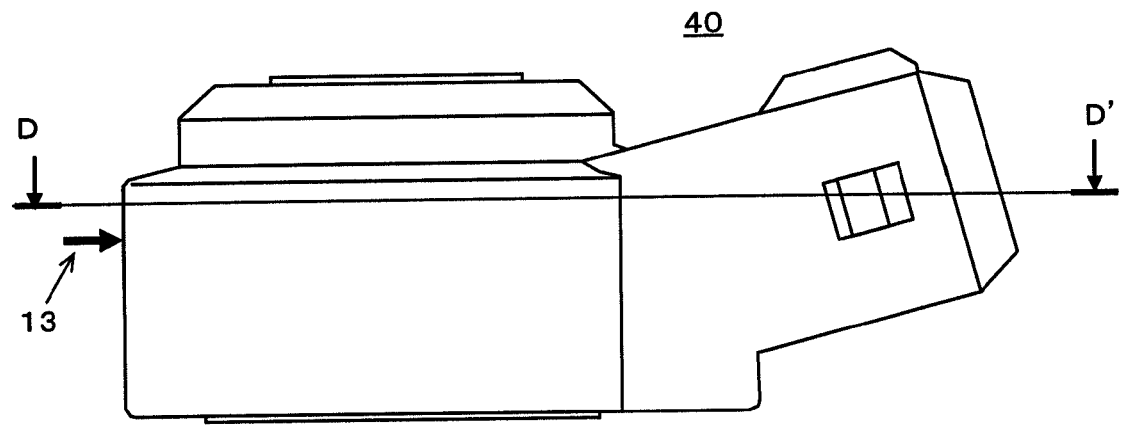
FIG. 9 is a side external view of the conventional knock sensor.
Figure 10:
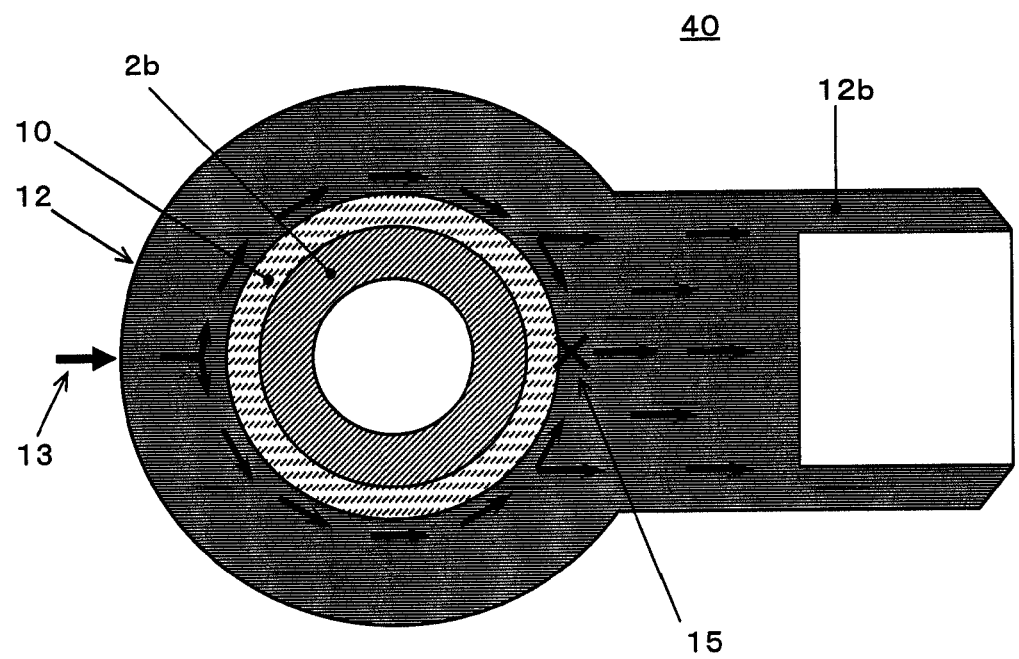
FIG. 10 is a cross-sectional view along the line C-C' in FIG. 9.

FIG. 4 is a top external view of a knock sensor 30 according to Embodiment 3 of the present invention, FIG. 5, an external view of the knock sensor viewed from the direction indicated by B in FIG. 4, and FIG. 6, a cross-sectional view along the line C-C' in FIG. 5.

While the interior construction of the knock sensor according Embodiment 3 is the same as that of Embodiment 2 described above, the injection gate 13 for the resin mold 12 is located in a position corresponding to a position on the circumference of the first cylindrical mold section 12a, where the gate forms an angle of 90° with respect to the center line connecting the center of the connector section 12b with that of the cylinder section 2b of the base 2. Moreover, although the weld 16 is formed in a position 180° opposing the injection gate, the position in this construction is slightly shifted toward the connector section 12b under the influence of flow balance of mold material for outer covering, due to the connector section 12b. In the knock sensor according to Embodiment 3, an overflow section 14 for mold material is provided in a position, on the circumference of the first cylindrical mold section 12a, where the weld 16 is formed.

According to the knock sensor of Embodiment 3 constructed as above, since mold material fills the overflow section 14 after filling the weld 16 portion, time length necessary for the mold material to completely fill the weld 16 portion becomes longer by time length necessary for the mold material to completely fill the overflow section 14, so that the time difference between time length necessary for the mold material to completely fill the connector section 12b to the extreme end thereof and that necessary for the mold material to completely fill the weld 16 portion is further decreased, which therefore brings about an effect in that the junction strength of the weld 16 can be further enhanced compared to that in Embodiment 1.

Furthermore, using nylon resin as the mold material in above-described Embodiment 1 through Embodiment 3 enables a highly reliable knock sensor to be manufactured at lower cost.

Moreover, the present invention is not limited to the above-described embodiments, and it is obvious that various changes can be made without departing from the scope of the present invention.

What is claimed is:

1. A knock sensor, comprising:
   a base including a cylinder section, a flange section formed at one end of the cylinder section and a through-hole passing through the cylinder section and the flange section;
   annular constituent parts for the knock sensor including an annular piezoelectric element, terminal plates through which an output signal is taken out from electrodes of the piezoelectric element, annular insulation sheets, and an annular weight, the annular constituent parts being inserted onto the cylinder section of the base;
   a pressing member for pressing the annular constituent parts onto the flange section of the base; and
   a resin mold including a first cylindrical mold section that encloses the base, the annular constituent parts and the pressing member, and a connector section that encloses a terminal or lead-wire lead-out section for connecting the terminal plates to outside equipment and is integrally injection-molded at one time with the first cylindrical mold section, protruding from a side thereof; wherein the resin mold is formed using an injection gate, located at a position corresponding to a position on a circumference of the first cylindrical mold section excluding a portion thereof opposing the connector section, which forms a predetermined angle with respect to a center line connecting a center of the connector section with that of the through-hole of the base.

2. The knock sensor according to claim 1, wherein the predetermined angle with respect to the center line is within a range of 45° to 120°.

3. The knock sensor according to claim 2, wherein an overflow section is provided, close to a weld that is formed on the circumference of the first cylindrical mold section, in a position opposing the injection gate for the resin mold.

4. The knock sensor according to claim 1, wherein nylon resin is used as a material for the resin mold.

5. A method for manufacturing a knock sensor which comprises:
 a base including a cylinder section, a flange section disposed at one end of the cylinder section, and a through-hole passing through the cylinder section and the flange section;
 annular constituent parts for the knock sensor including an annular piezoelectric element, terminal plates through which an output signal is taken out from electrodes of the piezoelectric element, annular insulation sheets, and an annular weight, the annular constituent parts being inserted onto the cylinder section;
 a pressing member for pressing the annular constituent parts onto the flange section; and
 a resin mold including a first cylindrical mold section that encloses the base, the annular constituent parts, and the pressing member, and a connector section that encloses a terminal or lead-wire lead-out section for connecting the terminal plates to outside equipment and is integrally injection-molded at the same time as the first cylindrical mold section, protruding from a side thereof;

the method comprising:
 positioning an injection gate for the resin mold at a position corresponding to a position on a circumference of the first cylindrical mold section excluding a portion opposing the connector section, thereby forming a predetermined angle with respect to a center line connecting a center point of the connector section with a center point of the through-hole; and
 injecting the resin mold from the injection gate to form the first cylindrical mold section and the connector section.

6. The method according to claim 5, wherein the predetermined angle with respect to the center line is from approximately 45° to approximately 120°.

7. The method according to claim 6, further comprising:
 providing an overflow section proximate to a weld that is formed in the first cylindrical mold section in a position opposing the injection gate.

8. The method according to claim 5, wherein the resin mold comprises nylon resin.

9. A knock sensor apparatus, comprising:
 a base including a cylinder section, a flange section disposed at one end of the cylinder section, and a through-hole passing through the cylinder section and the flange section;
 annular constituent parts for the knock sensor including an annular piezoelectric element, terminal plates through which an output signal is taken out from electrodes of the piezoelectric element, annular insulation sheets, and an annular weight, the annular constituent parts being inserted onto the cylinder section;
 a pressing member which presses the annular constituent parts onto the flange section; and
 a resin mold including:
  a first cylindrical mold section that encloses the base, the annular constituent parts, and the pressing member, and
  a connector section which protrudes from a side of the first cylindrical mold section and encloses a terminal or lead-wire lead-out section for connecting the terminal plates to outside equipment and is integrally injection-molded at the same time as the first cylindrical mold section;
 wherein the resin mold is formed using an injection gate, located at a position corresponding to a position on a circumference of the first cylindrical mold section excluding a portion opposing the connector section to form a predetermined angle with respect to a center line connecting a center point of the connector section with a center point of the through-hole.

10. The apparatus according to claim 9, wherein the predetermined angle with respect to the center line is from approximately 45° to approximately 120°.

11. The apparatus according to claim 10, further comprising:
 a weld disposed in the first cylindrical mold section proximate the connector section; and
 an overflow section position which is defined proximate to the weld and opposing the injection gate position.

12. The apparatus according to claim 9, wherein the resin mold comprises nylon resin.

* * * * *